Sept. 19, 1967  H. TREPPSCHUH ET AL  3,342,250
METHOD OF AND APPARATUS FOR VACUUM MELTING
AND TEEMING STEEL AND STEEL-LIKE ALLOYS
Filed Nov. 2, 1964  4 Sheets-Sheet 1

Fig. 1

INVENTORS
Helmut Treppschuh
Robert L. Hentrich
BY

INVENTORS
Helmut Treppschuh
Robert L. Hentrich

United States Patent Office

3,342,250
Patented Sept. 19, 1967

1

3,342,250
METHOD OF AND APPARATUS FOR VACUUM MELTING AND TEEMING STEEL AND STEEL-LIKE ALLOYS
Helmut Treppschuh and Robert L. Hentrich, Geisweid, Germany, assignors to Stahlwerke Sudwestfalen AG., Geisweid, Germany
Filed Nov. 9, 1964, Ser. No. 409,712
Claims priority, application Germany, Nov. 8, 1963, St 21,298
24 Claims. (Cl. 164—50)

The present invention relates to a method of and apparatus for vacuum melting and teeming steel and steel-like alloys such as super-alloys. More specifically, the present invention concerns a method and apparatus of the above-mentioned type according to which, after melting and treating steel or steel-like alloys in a high vacuum, the further metallurgical work and the teeming are effected at increased pressure or in cooperation with a protective gas.

Such methods are usually practiced in vacuum induction furnaces. Such furnaces, however, have the disadvantage that the melting has to be effected in ceramic-lined crucibles which have a rather short life and moreover lead to contamination of the melt by ceramic inclusions. The so-called "skull" melting furnaces which operate with electric arc heating employ water cooled copper crucibles, thereby avoiding oxidic ceramic inclusions. The said skull melting furnaces must be operated either with self-consuming electrodes made of the material of the melt or with non-consumable electrodes as, for instance tungsten or graphite. Self-consuming electrodes of the said type can be produced at high cost only, whereas non-consumable electrodes lead to contamination of the melt.

When heating by means of corpuscular beam heat sources, or, more specifically, with plasma beam or electron beam heat sources, the need of electrodes used in electric arc heating, or ceramic crucibles used in induction heating, will be avoided. However, both kinds of heating i.e. plasma beam and electron beam heating have inherent disadvantages.

A furnace heated by plasma burners must always operate at a specific gas pressure. It thus can be developed into a protective gas furnace which, under certain circumstances, can operate in low and intermediate vacuums but hardly as a high vacuum furnace.

Plasma furnaces which operate at normal pressure have been suggested, for instance, in the form of the so-called "Plasmarc" furnace of The Linde Corporation (see, for instance "Journal of Metals," December 1962, page 907).

A furnace heated by electron beams said beams being produced by any type of hot filament electron gun (as described e.g. in Bunshah, "Transactions Vacuum Metallurgy Conference 1962," American Vacuum Society, Boston, Mass., pages 68–94), on the other hand, is no doubt a high vacuum furnace inasmuch as the electron guns used therein operate at a pressure of the order of magnitude of less than 0.1 millitorr to about 10 millitorrs. Even where electron guns with pressure stages are concerned (see, for instance, M. v. Ardenne, "Tabellen zur angewandten Physik," Berlin, 1962, Section 1.8.16.2) use is made of a pressure in the working chamber, if required, of not more than 30 millitorrs. At such low pressures it is possible to effect excellent purification of the melts from undesired incidental ingredients of that type which is easily evaporated in a high vacuum. Unfortunately, however, with the undesired ingredients, also desired ingredients having a high vapor pressure are removed from the melt. Thus, manganese in particular is evaporated.

It has been found, according to the present invention, that when melting steel, for instance, the following manganese losses occurred in a high temperature resisting (i.e. highly refractory) steel with 1.4% manganese. The manganese content was lowered to 0.75% in one remelting process and to 0.30% in a double remelting process. A non-magnetic steel with 8% Mn, after slow remelting, still had a 1% Mn, and after quick remelting, still had 4% Mn. In a ball bearing steel of the type SAE 52100, the manganese content evaporated in a single remelting operation from 0.35% Mn to 0.10% Mn. Similar observations have been made with practically all types of steel presently on the market which could advantageously be remelted in a hot filament high vacuum electron beam furnace. Such deviations in the Mn content are not permissible with many specifications of analyses and consequently electron beam melting cannot be used in such instances.

It is, therefore, an object of the present invention to provide a method of and apparatus for vacuum melting and teeming steel and steel-like alloys, which will overcome the above-mentioned drawbacks.

It is another object of this invention to provide a method of and apparatus for vacuum melting and teeming steel and steel-like alloys which will bring about that under atmospheric pressure or pressures slightly above or below atmospheric pressure variation in the composition of the melt as a result of volatilization of individual constituents will no longer ensue, as would be the case when heating by electron beams during the teeming period, in view of the high vacuum necessary in operating with hot filament high vacuum electron guns.

It is a still further object of this invention to provide a method of and apparatus for vacuum melting and teeming steel and steel-like alloys which will make it possible, with a furnace designed for casting heavy ingots (of for example a maximum weight of 20,000 kilograms or any other maximum weight) and at the same time having only rather small crucibles of, for instance 500 kilograms capacity, to produce ingots from 500 kilograms in weight to about for example 20,000 kilograms in weight with the same degree of efficiency.

Another object of this invention consists in the provision of a method and apparatus as set forth in the preceding paragraphs which will permit working with plasma beam heating at a pressure considerably greater than atmospheric pressure.

These and other objects and advantages of the invention will appear more clearly from the following specification in connecton with the accompanying drawings, in which.

The method according to the present invention is characterized primarily by the steps of preparing and refining a steel or steel-like complexly compounded melt in a copper crucible or in a ceramic or refractory crucible in a high vacuum of less than 100 millitorrs pressure by heating with electron beams produced in a hot filament high vacuum electron gun, stopping said heating with electron beams and applying to the melting heat from another corpuscular beam heat source, which can be operated at pressures higher than the operating pressure of the hot filament high vacuum electron beam gun (throughout the rest of this text this type of heat source will be referred to shortly as "high pressure corpuscular beam heat source") under such higher pressure, which may be anywhere from 100 millitorrs to several atmospheres (or several hundred p.s.i. while adding thereto easily volatile alloying constituents such as Mn, Al, Cu, and Pb, and thereafter teeming the melt into a mold at any desired pouring rate while maintaining the high pressure corpuscular beam heating.

More specifically, according to the present invention first a melting with electron beams is carried out in order, during the melting, to obtain the benefit of the high vacuum for purifying the melt. Thereafter, melting with electron beams is replaced by heating by high pressure corpuscular beams (e.g. with plasma beams) which permits operation at higher pressures so that highly volatile alloying constituents can safely be added.

Figure 1:
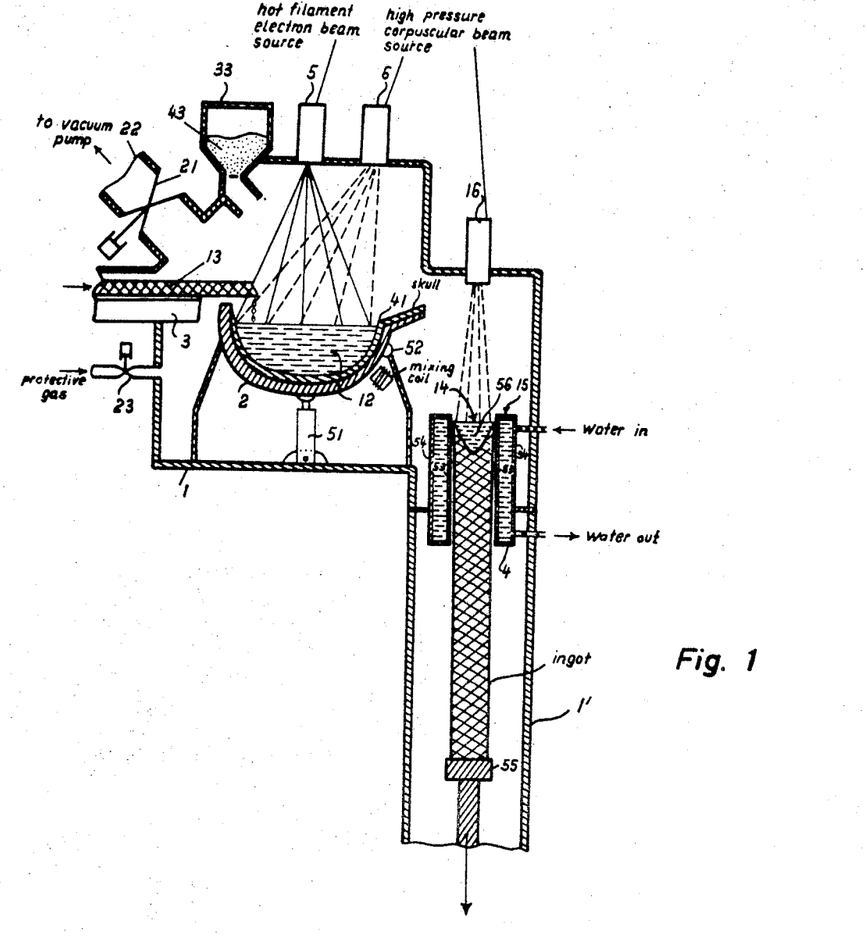
FIGURE 1 diagrammatically illustrates an apparatus according to the present invention.

Referring now to FIG. 1 of the drawing, this figure shows a furnace 1 capable of being exhausted and adapted to be filled with a protective gas. Furnace 1 furthermore comprises a water-cooled copper crucible 2, a material adding or feeding device 3, and an ingot mold 4. The melting charge may selectively be heated either by a hot filament high vacuum electron beam device 5 of any standard design or by a high pressure corpuscular beam heat source as for instance a plasma burner 6 likewise of any standard design.

The operation of the furnace is as follows: Furnace 1 is by means of a pump and through a vacuum valve 21 and a pipeline 22 exhausted so as to obtain a high degree of vacuum of, for intsance $10^{-3}$ torrs. The electron beam device 5, for example of 2 mw. power, is then switched on. Material 13 to be melted is conveyed by a material feeding device 3 into the electron beam so rapidly that the liberated gases can be drawn off or exhausted by means of pumps at the working pressure of the electron radiating device 5, for instance at a pressure of $10^{-3}$ torrs. After the crucible 2 has been filled with the melt 12, for instance with 500 kg. (kilograms) of the melt, the power of the electron beam device 5 is reduced to such an extent, for instance to about 500 kw., that the melt 12 remains precisely at a desired temperature, as for instance 1600° C. No further material is melted. Instead, the pressure in the treatment chamber is further reduced, for instance to the greatest degree of vacuum attainable with the pumps, which may be around $10^{-3}$ torrs. At the same time, melt 12 is thoroughly de-gassed. The electron beam device 5 is then switched off, and a vacuum valve 21 in pipeline 22 is closed. Furnace 1 is filled with a protective gas such as argon through valve 23, and the high pressure corpuscular beam device, which may be the plasma burner device 6 is switched on with a power of, for example, 500 kw. This is sufficient to hold the melt at the desired temperature of, for instance 1600° C. At this time, the still lacking, easily volatile melt constituents 43 of the charge, in particular manganese, and also aluminum, copper, lead, etc., are added through feeding device 33. The constituents can no longer volatilize. After they have become dissolved and sufficiently intermixed with melt 12 this mixing being performed by currents within the melt originating from local temperature differences, the contents of crucible 2 is slowly teemed into the ingot mold 4 while the high pressure corpuscular beam heating is maintained. This ingot mold may preferably be in the form of a continuous casting mold so that the level 14 of the bath can always be kept near the edge 15 of the mold. Teeming may now proceed at any desired slow rate in the same way as in the vacuum electric arc furnace with self-consuming electrode or a similar electron beam furnace. The bath level or surface 14 may at the same time be additionally heated by means of a plasma burner 16. This additional plasma burner is adapted to supply energy to the surface of the melt content in the ingot mold, whereby the temperature of the melt may be maintained at a desired value at all times during teeming, so that radiation and temperature losses in the entire system can likewise be reduced.

EXAMPLE

A melt of 500 kg. (kilograms) weight is slowly teemed within 30 minutes in conformity with a pouring rate of 10 kg. per minute. With steel melts having a density of 7.15 kg. per cubic decimeter, and a mold cross section of 14 square decimeters, a freezing rate is obtained of $$\frac{10 \frac{kg.}{min.}}{7.15 \frac{kg.}{dm.^3} \times 14 \ dm.^2} = 0.1 \frac{dm.}{min.} = 1 \frac{dm.}{min.}$$

Such freezing rate resulted in an excellent ingot texture, as borne out by tests made with an ingot prepared according to the above-mentioned example.

It is to be understood that also higher freezing rates are applicable. Freezing rates within the range of from .1 to 10 centimeters per minute yield good textures.

The great advantage of high pressure corpuscular beam heat such as plasma heat during the teeming period (50 minutes in the above-mentioned example) consists in that under atmospheric pressure or pressures slightly above or below such as prevails during the plasma heating, variations in the composition of the melt as a result of volatilization of individual constituents no longer ensue, in contrast to the variations which occur when heating by hot filament high vacuum electron beams during the teeming period, which will be caused by the high vacuum unavoidably necessary when operating with hot filament high vacuum electron beam devices.

Figure 2:
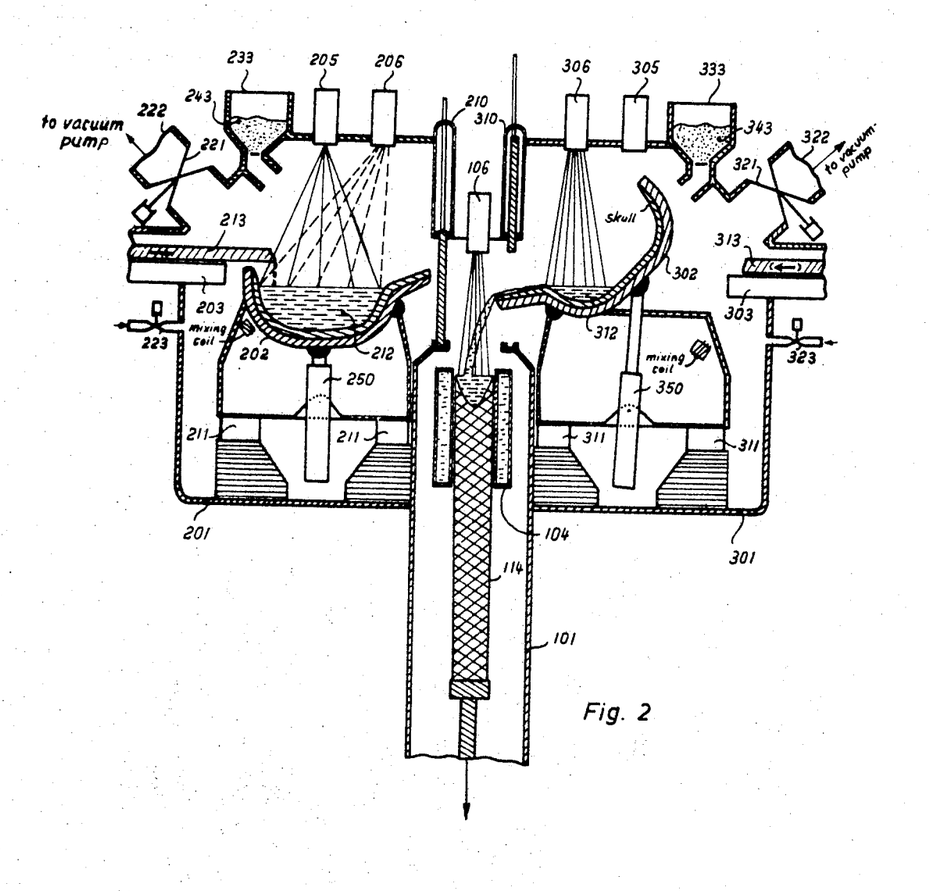
FIGURE 2 is a diagrammatic representation of a duplex plant according to the invention.
Figure 4:
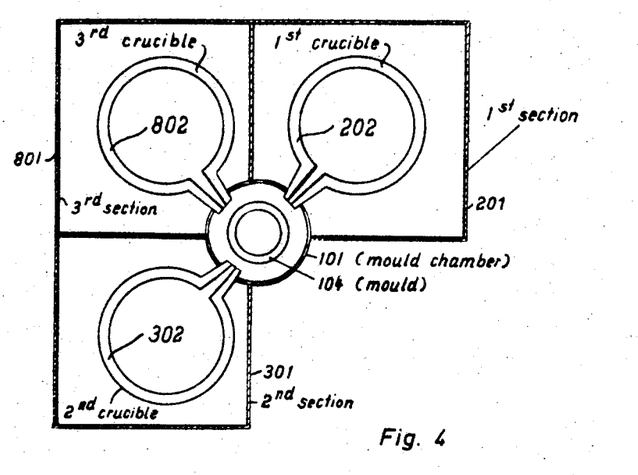
FIGS. 4, 5, 6 diagrammatically illustrate modifications of the embodiment according to FIGS. 1 and 2, using additional vessels or channels.

A preferred embodiment of an apparatus according to the invention is shown in FIG. 2, according to which the furnace is divided into at least three parts 101, 201 and 301. These parts may pneumatically be separated from each other by means of valves 210 and 310. The furnace section 101 accommodates an ingot mold 104 which corresponds to mold 4 in FIG. 1. Furnace sections 201 and 301 have arranged therein crucibles 202 and 302, material feeding devices 203 and 303 for material 213 and 313 to be melted, material feeders 233 and 333 respectively for easily volatile materials 243 and 343, hot filament high vacuum electron beam devices 205 and 305, high pressure corpuscular beam devices 206 and 306, which may be the plasma burners 206 and 306. These devices and elements substantially correspond to the elements 2, 3, 13, 33, 43, 5 and 6 in furnace 1 of FIG. 1. Further furnace sections (not shown in FIG. 2) of substantially the same design as sections 201 and 301 such as section 801 illustrated in FIG. 4 may be added to the embodiment according to FIG. 2 and operated substantially in the same way as hereinafter described for sections 201 and 301.

The melting crucibles 202 and 302 operate alternately in such a way that while one is melting and refining and alloying a melt the other simultaneously is teeming a melt. For example, when valve 210 is closed, furnace section 201 is under a high vacuum, and the melting charge is melted down and de-gassed by hot filament high vacuum electron beam heating. Subsequently, the pressure is raised, and a changeover to high pressure corpuscular beam heating, such as plasma heating is carried out, while at the same time the necessary easily volatile constituents 243 are being added to the melt. At the same time, while valve 310 is open, the finished melt 312 in crucible 302 is kept hot by heating by high pressure corpuscular beam heat source 306, which may be plasma burner 306 and is slowly poured into the ingot mold 104. The level of the bath in the ingot mold 114 may at the same time be additionally heated by means of a further high pressure corpuscular beam heat source 106, such as plasma device 106. The teeming speed is so controlled by pressure measuring boxes 311 which may be load cells of any conventional design that melt 312 is completely teemed when melt 212 in crucible 202 is completely alloyed and ready to be teemed. The feedback of the signal derived from load cells 311 to tilting mechanism 350 is performed by conventional means well known to those familiar with the art of automatic weighing. At this instant, valve 210 is opened, and ingot 114 is filled from crucible 302 at the same teeming rate. Crucible 302 is then tilted back and valve 310 is closed. Thereupon, furnace section 301 is evacuated to create a high vacuum therein. Preparation of a new melt is then immediately started in crucible 302 by melting down and de-gassing by means of hot filament high vacuum electron beam heating, and then by alloying with easily volatile constituents while employing high pressure corpuscular beam heating such as plasma heating.

Pressure measuring boxes or load cells 211 under crucible 202 in the meantime bring about that the teeming rate from the crucible 202 is adjusted in conformity with the time of preparation of melt 312 in crucible 302, so that melt 312 is just ready for teeming when the teeming from crucible 202 is completed. In this way, by alternative operation of at least two relatively small melting crucibles 202 and 302, ingots of any desired sizes can be cast within the compass of the ingot mold 114. This yields the great advantage that with a furnace designed for casting ingots 114 of for instance 20,000 kg. (kilograms) weight and at the same time having crucibles 212 and 312, for example of 500 kg. capacity each, ingots of 500 kg. in weight up to about 20,000 kg. in weight can be produced with approximately the same degree of efficiency. Moreover, an order of, for example 100 t. (metric tons) of a steel grade A in ingots of, for instance 1 t. in weight, can be filled at the same degree of efficiency as, for instance an order for only 1.5 t. of a steel grade B in ingots of 500 kg. in weight. In the first instance, 100 charges of crucible 212 and 100 charges of crucible 312 of 500 kg. each must be melted and teemed to provide in all 100 ingots 114, each of 1,000 kg. in weight. In the second instance, only 3 crucible charges each of 500 kg. in all are produced, and these are teemed to provide 3 ingots 114 of 500 kg.

The numerical examples set forth above are, of course, merely illustrative and by no means limiting and may be varied in conformity with the requirements. It will also be evident that the principle of alternate phase operation of the crucibles 202 and 302 may also be applied in a furnace with more than two, for example with three or more crucibles. If, for instance, the teeming time for a single crucible is too short to have the melt prepared in the second crucible, a third crucible may be added. With a teeming period of 50 minutes for one crucible, there would then be available a melting time of 100 minutes per crucible instead of only 50 minutes, as would be the case when working with two crucibles.

An important advantage obtainable with the arrangement of FIG. 2 consists in that the furnace section 101 need not necessarily be vacuum-tight. To the contrary, the system may be permitted to work at atmospheric pressure, and the ingot mold may be a continuous casting unit of conventional design according to which the ingots are discharged downwardly to atmosphere and may be cut to suitable length. The necessity of passing ingots out of a closed apparatus through locks has thus been eliminated. Even when a fully continuous casting arrangement is not contemplated, but ingots are cast which have an approximate length of only 2 yards, the withdrawal of these ingots is greatly facilitated by omission of ingot mold locks.

The plants illustrated in FIGS. 1 and 2 furthermore permit working with plasma heating at a pressure considerably higher than atmospheric pressure. If nitrogen is used as the plasma gas and as the furnace filling, the alloying of steel with nitrogen may be obtained in a particularly convenient manner, with the result that many types of steel will acquire improved properties. It is known that the solubility of nitrogen on one hand increases with the square root of the pressure, and that on the other hand the solubility of nitrogen is also aided by a previous careful reduction of the oxygen content. Since, furthermore, nitrogen may be present in atomic or ionized form in the plasma flame, the possibility of increasing the nitrogen content is ideal. This possibility of increasing the nitrogen content is available when operating with nitrogen plasma at approximately atmospheric pressure. The nitrogen content thus obtainable in the melt is higher than when operating with other plasma gases. Obviously, operation with nitrogen plasma also facilitates additional alloying with nitrogen by means of nitrogenous ferrous alloys such as high nitrogen ferrochromium and high nitrogen ferromanganese.

A further interesting embodiment of the present invention may be obtained when a channel or an intermediate vessel or a system of such channels or vessels is disposed between the melting crucibles 2, 202, 302 and the mold 4, 104. These channels or intermediate vessels may be lined with ceramic material and/or may be designed as water-cooled channels or copper vessels, for example.

Figure 5:
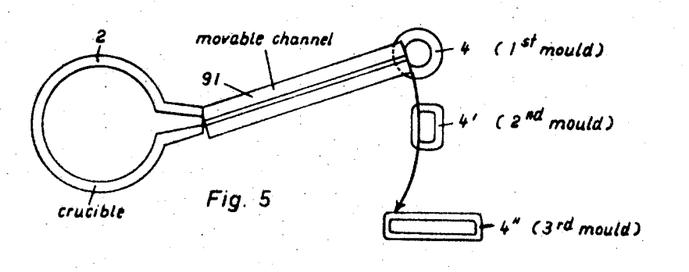
Figure 6:
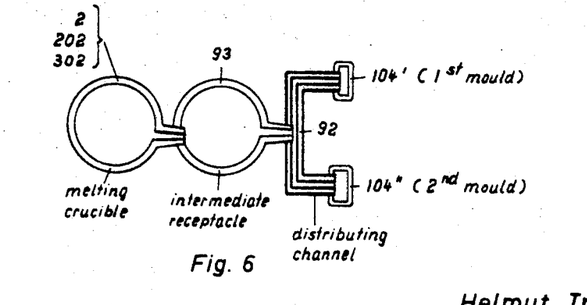

Such channel or system of channels yields a number of advantages. For instance, the melting crucibles 2, 202, 302 and the mold may be accommodated in separate vacuum receptacles which are connected by short pipes through which channels extend. The furnace sections 1 and 1' in FIG. 1, and 101, 201 and 301 in FIG. 2 may thus be entirely separate adjacent furnace bodies and need not be built in the compact form shown in FIGS. 1 and 2. Another advantage obtained by the use of such channels consists in that without great expense, there may be provided a number of molds, and teeming may be effected into one or another of said molds, in conformity with requirements. Thus, as illustrated in FIG. 5, for instance, a number of continuous casting molds 4, 4', 4" . . . of different diameters or cross-sections may be provided and may be used selectively according to the arrangement or disposition of the channels. In FIG. 5 a single channel 91 is shown, which may be positioned to fill either of 3 molds 4, 4', 4". Similarly, two or more continuous casting molds 104', 104" of the same cross-section may be employed, as shown in FIG. 6, and the teeming may be effected simultaneously into said molds if distributor grooves 92 or receptacles are provided for the melt. Such simultaneous teeming into a number of molds has the advantage that ingots of small cross-section can be cast at about the same freezing rate (centimeters per minute) as employed with teeming of large ingots, without the necessity of reducing the outflow speed or teeming rate (kg. per minute) of the melting crucibles.

In the immediately foregoing example, with a teeming rate of 10 kilograms per minute and a mold cross-section of 14 square-decimeters (about 220 square inches), the freezing rate of 1 centimeter per minute thus remains the same when teeming is effected simultaneously into two molds of 7 square decimeters (about 110 sq. in.) cross-section each or 4 molds of 3.5 square decimeters (about 55 sq. in.), cross-section each.

The melt in the channels may also be additionally heated by means of a high pressure corpuscular beam device, if the energy balance should so require.

The use of intermediate receptacles 93 together with, as illustrated in FIG. 6, or instead of the channels, may also be of interest. Thus, for instance, after completion of preparation thereof in the melting crucibles 2, 202, 302, the melt may first be teemed into an intermediate receptacle 93. This teeming may be effected quickly, for example, within a period of 1 minute. The crucible will then immediately be available for preparing the next melt. The slow teeming is effected from the intermediate receptacle into the mold device 4, 104, or as illustrated in FIG. 6 into the two molds 104', 104". The temperature of the metal in this intermediate receptacle is maintained by a further high pressure corpuscular beam heating device, which may be a plasma heating device. With a plant according to FIG. 2, two intermediate receptacles with high pressure corpuscular beam heating devices, such as plasma heating devices would be associated with the two crucibles 202 and 302. The advantage of such an arrangement consists in that for the preparation of the individual melt in the melting crucibles 202 and 302, there would be available a greater period of time than would be the case without intermediate receptacles. The period of time available is approximately doubled since, instead of 50 minutes required for emptying the crucibles as formerly, only about 1 minute would be required for the same purpose.

Figure 3:
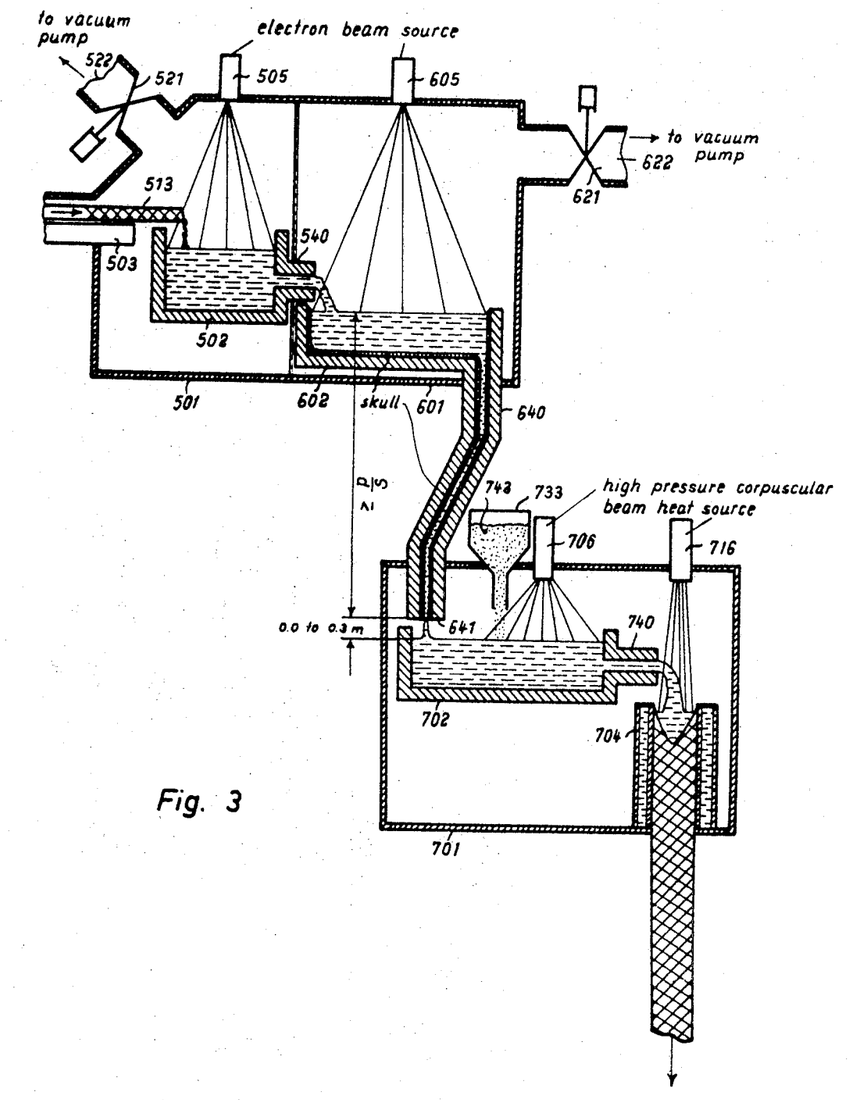
FIGURE 3 diagrammatically illustrates a continuous plant in conformity with the present invention.

Finally, the provision of one or more intermediate receptacles between the melting crucible 2 and mold 4 in a plant according to FIG. 1 permits the carrying out of a fully continuous process. FIG. 3 shows a plant which permits such a fully continuous operation. This plant consists essentially of a vessel 501 evacuated through a valve 521 and a vacuum line 522, of a vessel 601 evacuated through a valve 621 and a vacuum line 622, and of a vessel 701. The valves 521, 621 correspond to the vacuum valves 21, 221, and 321 above refered to. As will be seen from FIG. 3, instead of a tiltable melting crucible 2, there is provided a stationary crucible 502 heated by a hot filament high vacuum electron beam heating device 505. Continuous melting of the material 513 is effected, which material is supplied by means of the feeding device 503. The melt runs continuously through an overflow channel 540 into an intermediate receptacle 602 wherein it is heated in a high vacuum by means of another hot filament high vacuum electron beam device 605. The melt then flows through an overflow channel 640 into a second intermediate receptacle 702 into which easily volatile melt constituents 743 are supplied by means of a feeding device 733. The material in the receptacle 702 is heated by means of a high pressure corpuscular beam heating device 706, which may be a plasma device 706. The finished metal or alloy continuously runs from an overflow channel 740 into a mold 704 having associated therewith a further high pressure corpuscular beam heating device 716.

The actions taking place in the arrangement according to FIG. 3 are similar to those occurring in a plant according to FIGS. 1 and 2, in the melting crucibles 2 and 202 or 302. These actions are melting by means of high intensity electron beams at the highest permissible pressure at which the electron guns will work, de-gassing with electron beam heating at the lowest attainable pressure which is determined by the capacity of the vacuum pumps, alloying, maintenance of heat and teeming with high pressure corpuscular beam heating, for instance, plasma heating at approximately atmospheric pressure or at pressures above or below atmospheric. These actions take place in a plant according to FIG. 3 in close sequence with regard to each other but spatially separated in a melting crucible 502 and in intermediate receptacles 602 and 702. In order to be able to maintain different high pressures in the separate receptacles 501, 601 and 701, these receptacles are pneumatically separated from each other. The sole communication with the separate receptacles is effected by the overflow channels 540 and 640. In view of the difference in pressure between the separate receptacles 602 and 702, channel 640 is designed as a closed tube which is so dimensioned that the distance between the levels of the intermediate receptacle 602 and the lower end of tube 640 at 641 is at least $p/s$, in which $p$ stands for the pressure difference between receptacles 601 and 701, and in which $s$ indicates the specific gravity of the melt.

For the sake of completeness, it may also be mentioned that it is within the scope of the present invention to cary out the method of the invention, instead of with plasma beam heating as used, for instance in the above-mentioned "Plasmarc" furnace employing a quasi-neutral thermal plasma, by some other form of corpuscular heating permitting operation at pressures exceeding 100 millitorrs, for which type of heating the term "high pressure corpuscular beam heating" has been used throughout the preceding chapters.

Such a form of heating uses, for instance, a so-called plasma electron gun. With such gun, a quasi-neutral plasma at for instance a pressure of 0.1 to 10 torrs, sometimes even at atmospheric pressure is generated within a wire cage in a suitable manner such as by a high frequency gas discharge or direct current gas discharge. By means of appropriate electromagnetic fields, electrons are extracted from this plasma and focussed on the object to be heated. Since, in contradistinction to the high acceleration voltages used in hot filament high vacuum electron beam guns of the usual construction—which are of a magnitude of several times kv.×10—such an arrangement requires only very low acceleration voltages of the order of magnitude of several times $V \times 10$, up to a few kv., and permits operation at pressures of above 100 millitorrs (possibly even up to about atmospheric pressure), as is the case with the plasma beam sources. According to another form of such high pressure corpuscular beam heating, positive or negative ion beams are used with which the object to be heated is bombarded. Ion sources of high current density are known and have been developed interalia especially for particle accelerator devices such as, for example cyclotrons. (See, for instance, Kollath "Teilchen-Beschleuniger" (Particle Accelerators) published by Vieweg, 1955, pages 124 et seq.) Such ion sources also work satisfactorily at pressures of above 100 millitorrs. Similar to the plasma electron gun, ion sources are also set in motion, preferably from a quasi-neutral plasma from which the ions are withdrawn by suitable electromagnetic fields and focussed onto the object to be heated.

Theoretically, a flame drawing its energy from a chemical combustion could replace the plasma beam. In this case, however, there exists the danger that the reaction gases may form a composition which is harmful to the melt, in particular one consisting of water and carbon monoxide, nullifying the previously effected removal of hydrogen and oxygen. Aside from exceptional cases in which such a reaction may be desirable, flames of combustion should, therefore, not be considered for the process according to the present invention. Nevertheless it should be understood that a chemical flame is some sort of "high pressure corpuscular beam" too, as it is defined in the present invention.

For the sake of simplicity, the above description differentiates only between "hot filament electron beam heating" and "high pressure corpuscular beam heating." However, hot filament (high vacuum) electron beam heating as it is refered to in this specification, should be construed to embrace heating by electron guns using an acceleration voltage of the order of magnitude of several times 10 kilovolts and require a high vacuum for their operation, which type of guns generally make use of a hot cathode or hot filament for producing electrons. High pressure corpuscular beam heating, as it appears in this specification, is to be construed as embracing all means of heating by corpuscular beams working at pressures over 100 millitorrs up to pressures well above atmospheric pressure.

The applications where use is made of nitrogen as an alloying element are, of course, operable efficiently only when heating is effected by means of nitrogen plasma or nitrogen ion radiation and are but incomplete with the use of plasma electron gun heating. The advantages with regard to the addition of easily volatile alloy constituents, on the other hand, are maintained completely and absolutely also with heating by plasma electron guns.

To further illustrate the present invention, a few examples shall be given of actual melts produced in apparatus and by method according to the present invention.

EXAMPLE

In an apparatus according to FIG. 1 stainless steel scrap 13 is charged by means of charging device 3 into the vacuum chamber 1. Inside this chamber a pressure of $10^{-2}$ torrs is maintained. The chemical composition of the scrap is as follows: 0.03% C, 0.04% Si, 1.43% Mn, 0.023% P, 0.012% S, 0.76 Co, 17.63% Cr, 0.10% Cu, 3.00% Mo, 14.67% Ni, 0.018% O, 0.0135% N, 0.00113% H. The electron beam gun 5, which is of the multistage type as described in the above-mentioned "Tabellen zur angewandten Physik" (Tables for Applied Physics) by M. v. Ardenne in section 1.8.16.2, gets such a heating power for its hot filament, that an electron beam current of 50 a. (amperes) is produced. This current of 50 a. is accelerated by an accelerating voltage of 20,000 v. (volts). The electron beam so produced has a total power output of 50 a.×20 kv.=1000 kw. (kilowatts). By means of electromagnetic deflection coils this beam is directed partly onto the gradually fed in stainless steel scrap melt stock 13, which is melted down by the electron bombardment and partly to the liquid pool 12 formed by the molten scrap, to keep the latter liquid. This operation is continued until the crucible 2 is filled with molten metal. The crucible, which is made from a special copper alloy, is water-cooled in such a way, that its inner surface get a temperature of about 400° C. With this temperature of the crucible wall a solid skull 41 of the metal charged into the crucible is built up between crucible wall and liquid metal. The melt is confined therefore within a skull of substantially the same analysis as the melt itself. No contamination of the melt having its origin in the confining vessel is possible after the skull has been built up. The crucible 2 being filled with molten metal, no more scrap is fed into the vacuum chamber. The current in the electron gun is reduced now to 20 a., resulting in a total beam energy of 400 kw. (kilowatts), which are sufficient to keep the melt liquid and superheating it to 1700° C. The beam deflection system now is operated in such a way that only the surface of the molten pool is scanned by the beam. If the scan is arranged is such a way, that only a portion of said surface lying in between the center of the crucible and its edge is scanned with a fast frequency of about 60 cycles per second, this portion is slightly superheated with regard to the rest of the melt. A small temperature gradient is built up within the melt therefore, causing a motion of the liquid metal within the crucible. If by means of a superimposed slow scan of about one half cycles per second the slightly superheated portion of the melt is caused to slowly rotate around the center of the crucible, a very thorough mixing of the entire contents of the crucible is performed, because the slowly rotating temperature gradient also causes the melt to rotate in substantially the same direction. While the melt is kept liquid and superheated and while mixing is performed by means of the slowly rotating electron beam scan, the pressure inside vacuum chamber 1 is further lowered to the maximum degree obtainable with the vacuum pumps installed. With the type of steel of the present example a vacuum pump obtaining a pressure of $10^{-4}$ torrs or 0.1 millitorr is sufficient. Oil vapor ejector pumps backed by several stages of rotary pumps or steam jet ejector pumps are the preferred type of vacuum pumps used in this application. While the pressure is lowered and the melt is kept superheated additional amounts of unwanted components, such as oxygen (in the form of CO), hydrogen and copper are evaporated and pumped off. After 5 minutes the desired pressure has been attained and the desired degree of purification performed. The composition of the melt at this time is as follows: 0.018% C, 0.39% Si, 0.20% Mn, 0.023% P, 0.008% S, 0.76% Co, 17.10% Cr, 0.06% Cu, 3.00% Mo, 14.61% Ni, 0.0025% O, 0.0040% N, 0.00007% H. As can be seen from these data, the harmful constituents H, Cu, O, C, have been reduced considerably. But at the same time Mn was lowered too far, because a minimum content of 1% Mn is wanted in this particular grade of steel. N was lowered too, but additions were to be made later to get increased nitrogen-content resulting in increased strength levels of this steel.

With this analysis attained, the electron beam gun is completely switched off. The pressure inside the chamber 1 is now increased to 500 torrs and at the same time the corpuscular beam heat source 6 is switched on with a total power output of slightly less than 400 kw. At the same time an addition of high nitrogen ferromanganese 43 is made by means of charging device 33. The corpuscular beam heating device is of the type illustrated in "Journal of Metals," December 1962, page 907 et seq. and is operated with nitrogen. The atmosphere inside chamber 1 is a pure nitrogen atmosphere therefore. By leading the direct electric current fed into the corpuscular beam heating device through a coil mounted on the bottom of crucible 2 (as illustrated in the above-mentioned article in "Journal of Metals") a thorough electromagnetic stirring action is performed within the liquid metal. The added high nitrogen ferromanganese therefore is rapidly dissolved and evenly distributed in the melt. As the pressure is high enough no volatilization of Mn or N or any other component of the melt occurs now. Therefore the composition of the melt remains substantially the same after the added material is dissolved. Only Mn and N (which were added) contents are increased. Mn is now 1.20% and N is now 0.15%. The power input to the corpuscular beam heating device 6 is further reduced now to an amount, at which the melt will finally be kept at a temperature of 1550° C., at which temperature teeming will be performed. But as a still higher nitrogen content is desired, the pressure in the chamber 1 is further increased to a level of 25 atm. (physical atmospheres) or about 375 lbs./sq. in., while the same power input is maintained. Keeping the melt hot and constantly stirred by the electromagnetic stirring action under this increased nitrogen pressure for about 20 minutes gradually increases the nitrogen content of the melt to 0.85% N. Now the melt is ready for teeming, having all alloying elements within the desired ranges of analysis, and having the detrimental elements oxygen, hydrogen, cooper and carbon lowered considerably to a level, where they are less harmful. Now the crucible 2 is tilted by means of tilting mechanism 51 around tilting axis 52 in such a manner that the liquid metal slowly flows out into the mould setup 4. The mould setup 4 is a typical continuous casting mould of a design well known to those familar with the art of continuous casting liquid steel. In the present example it comprises a double-walled tube with inner wall 53 and outer wall 54, fabricated from a special copper alloy and cooled by water flowing through the space between inner wall and outer wall. A water cooled starting disc 55 made from the same copper alloy is located inside said inner wall making a bottom for the said double-walled tube. When liquid metal 12 enters the space in between said inner wall and said starting disk, metal quickly solidifies at this inner wall and that starting disk, leaving a pool 56 of liquid metal inside the so formed skull. When the mould setup is filled substantially up to the edge 15 the starting disk 55 is retracted downwards at the same speed the metal pool 56 is rising within the mould. By this manner a cylindrical ingot is cast of substantially the same cross-section as the inner cross-section of the mould. The surface 14 of the liquid pool 56 is always kept at the same height. To get a sound ingot the surface of the liquid pool must always be kept liquid over its total area. To perform this, an additional corpuscular beam heat source 16 is provided, which is operated during teeming with just enough power output to keep the surface 14 totally liquid. To retain the high nitrogen content during teeming this heat source 16, which is of the same type as heat source 6, is operated with 25 atm. of nitrogen pressure too. Also, to keep the melt 12 liquid during teeming, power input to corpuscular beam heat source 6 is not switched off but may be gradually decreased as the melt left in the crucible becomes less and less. As mechanical sweep rather than electronic scan is to be used with plasma beam sources, source 6 may be mechanically tilted during teeming in such a way, that the hot plasma beam always hits the remaining portion of the liquid metal still left in the crucible. The freezing speed in the present example, which is equal to the speed of retraction of the starting disc 55, is 0.9 cm./min. (centimeters per minute). After having built up the liquid pool 56 inside the mould setup, a mechanical drive (not shown in FIG. 1) is set to a constant speed of retraction of the starting disc 55, said constant speed being 0.9 cm./min. The tilting mechanism 51 of the present example is manually operated by an operator and adjusted in such a manner, that the level of the surface 14 of liquid pool 56 always remains at constant level, while the ingot, built up from the teemed metal is continuously withdrawn from the lower end of mould setup 4 with the constant retraction speed of 0.9 cm./min. When the crucible 2 is empty, heat source 6 and mechanical ingot retraction drive are switched off. The power input to heat source 16 is gradually diminished to provide gradual solidification of the pool 56 at the upper end of the cast ingot. By not abruptly switching off this power input to source 16 formation of shrinkage holes is avoided. When the power input to source 16 finally has come to zero, teeming is finished and the ingot is solidified from bottom to top. Now the pressure inside chamber 1 and 1' is released to atmospheric pressure and the ingot is withdrawn from the mould setup. The ingot obtained has such a smooth surface, that almost no surface conditioning is needed before forging or rolling into the desired shape. Also the ingot has low levels of oxide inclusions and a negligible hydrogen content. Finally it has an increased nitrogen content, resulting in much higher strength levels as could be produced in normally melted steels of this type. After withdrawal of the ingot from chamber 1' and replacing starting disc 55 in its original position within the inner wall of mould setup 4 a new melt of the same grade may be produced in the apparatus according to FIG. 1. If another grade of steel is to be produced, the skull 41 must be removed from crucible 2 first, to prevent contamination of the following melt. Said following melt will build up its own skull then. Used skulls may be replaced in crucible 2, if the same grade of steel is to be produced again.

EXAMPLE

In an apparatus according to FIG. 2 solid feedstock 213 and 313 comprising conventionally cast ingots of superstrength steel is used. Composition of this feedstock is 0.40%, C, 0.30% Si, 0.30% Mn, 0.009% P, 0.005% S, 0.13% Cu, 0.90% Cr, 0.38% Mo, 1.81% Ni, no V, no Al, .013% O, 0.0025% N, 0.002% H. This is not yet the desired composition of the steel to be produced. Also the ingots are full of blowholes and have a poor grain structure. They were produced in an airmelt electric arc furnace. Furnace practice was adapted to produce this meltstock suitable for melting in an apparatus according to the present invention in the cheapest and fastest possible way. No emphasis whatsoever was put onto obtaining sound ingots. Main emphasis was put on the following objects: Reducing sulfur and phosphorus to as low values as possible, as these elements are very harmful to this type of steel, but only sulphur is reduced a little bit by electron beam melting, whereas phosphorus is not reduced at all; obtaining absolutely homogeneous feedstock with regard to chemical composition, so that heats produced from this feedstock under exactly the same physical conditions will have substantially the same analysis, with only negligible deviations from heat to heat. With such feedstock large ingots may be produced from several small melts, even when these melts are not individually analyzed after melting with regard to their chemical composition.

The two crucibles 202 and 302 are used alternately for melting and teaming in such a way, that while one crucible is teeming its finished melt at a predetermined speed, a new melt is produced in the other crucible. To start the operation, feedstock 213 is melted with 1 mw. of power and under a vacuum of 50 millitorrs maintained in vacuum chamber 201. In this particular example exactly one full ingot of the feedstock, which has a weight of 700 kilograms, is melted in to make one full melt 212. The electron beam devices 205 and 305 used in the present example are of the so called "transverse gun" type as it is described in Bunshah, "Transactions Vacuum Metallurgy Conference 1962," American Vacuum Society, Boston, Mass., pages 68–94. In the "transverse gun" electrons emitted from a hot filament are accelerated and forced on a curved path by means of a magnetic field. As ions and atoms originating from the melt cannot follow the curved path of the electrons, the hot filament has a much longer life, as it is not bombarded by said ions or atoms. Electron beam devices 205 and 305 in the present example both comprise three of said "transverse guns," the energy of each first gun being used to melt down the feedstock 213 or 313, while the two remaining guns are used for heating the surface of the liquid melt 212 or 312. While the first gun of device 205 is still melting down the feedstock 213 with 1 mw. of power the second and third gun of device 205 are gradually switched on as the crucible is filled with more and more liquid metal. After complete meltdown of the 700 kg. of feedstock the first gun is switched off. At the same time the second and third gun are on full power, this power being adjusted in such a way that the liquid metal is kept at a temperature of 1750° C. Slow electromagnetic sweep may be provided for said second and third gun of device 205, to accomplish a stirring motion in the liquid metal 212, as it was described in the foregoing example. While keeping melt 212 at 1750° C. the pressure is lowered to $5 \times 10^{-5}$ torrs or 0.05 millitorr, resulting in excellent purification of the melt. After 10 minutes of refining time the desired pressure of 0.05 millitorr has been reached. The composition of the melt at this time is as follows: 0.39% C, 0.30% Si, 0.05% Mn, 0.009% P, 0.003% S, 0.05% Cu, 0.86% Cr, 0.38% Mo, 1.80% Ni, no V, no Al, 0.0008% O, 0.0009% N, 0.00002% H. Now the second and third guns of device 205 are switch off. The pressure is increased to 1 torr and corpuscular beam heating device 206 is switch on, having the same power output as device 205 had the moment before, thus maintaining the liquid metal at constant temperature. Device 206 is a plasma electron gun of the type described above. Now, from charging device 233 ferromanganese, ferrovanadium and aluminium are added to the melt 212 in such quantities, that after thorough mixing the melt has an analysis of 0.70% Mn, 0.10% Al and 0.10% V, the other elements remaining at the same level. Now the melt has the desired analysis and desired degree of purification and teeming can be started. For this purpose valve 210 is opened and valve 310 is closed. In chamber 301 at this time production of the second melt is started, said production performed in exactly the same manner as production of the now finished first melt was performed. To ensue complete identity of production performance a computer is used in the present example, which automatically corrects all melting data to give the same results.

Chambers 201 and 101 are now under the same pressure of 1 torr, and teeming is performed in substantially the same way as described in the foregoing example. The crucible 202 is tilted by means of tilting mechanism 250. The weight of the crucible and its support is measured at any given time by a set of load cells 211. The load cell output is fed back in a conventional manner to the tilting mechanism to ensue a constant teeming speed, which results in a total teeming time of exactly the same length as the complete melting time of one melt produced in crucible 202 or 302. Therefore teeming of crucible 202 is completed at the same time as crucible 302 is ready for teeeming. At this time valve 210 is closed again after the crucible 202 was tilted back into melting position, and valve 310 is opened to allow teeming of crucible 302. This procedure is repeated again and again until, in the present example, an ingot of about 14 t. weight was built up from 20 individual heats of 700 kg. each, every one of those heats melted and poured in an exactly identical manner. As long as teeming is continued in the present example, an additional plasma electron beam gun 106 with cold filament plasma as an electron source is operated under the same pressure of 1 torr as the devices 206 or 306 are operated.

EXAMPLE

In an apparatus according to FIG. 3 feedstock 513 is melted in under a pressure of 1 millitorr by means of electron beam gun 505, which is of the same type as gun 5 in the first of these three examples and is operated with 700 kw. of power output. Feedstock 513 consists of boxes, which are filled with a mixture of very clean raw materials (like nickel pellets, pure cast iron, ferrochromium etc.), mixed in such a way that their average analysis after meltdown is as follows: 0.05% C, 0.50% Si, 0.05% Mn, 0.015% P, 0.010% S, 15.80% Cr, 0.04% Cu, 1.20% Mo, 26.5% Ni, no Al, no V, no Ti, 0.0100% O, 0.0090% N, 0.0002% H. This material is melted down and prerefined in ceramic lined crucible 502. From this crucible it flows into the next compartment, which in the present example is a rather shallow but elongated crucible 602. Crucible 602 is a water cooled crucible made from a special copper alloy. In chamber 601 a pressure of 0.02 millitorr is maintained and at the same time the melt flowing on the skull formed in water cooled crucible 602 is superheated by electron beam bombardment from beam source 605, said beam source comprising, in the present example, two "transverse guns" of the type, mentioned before, with each of them having a maximum power input of 300 kw. At the time, the melt flows down through tube 640, which is also a cold-wall tube with skull-formation, the melt has obtained an excellent degree of purification, with oxygen as low as 0.0003%, nitrogen as low as 0.0004%, hydrogen as low as 0.00002%. The melt flows out into crucible 702, which again is a cold wall crucible and is maintained under atmospheric pressure and under an argon atmosphere. The melt in crucible 702 is heated by argon operated plasma beam device 706 of substantially the same design as device 6 in the first of these three examples. A mixture 743 of ferromanganese, ferrotitanium and ferrovanadium is constantly fed into crucible 702 at such a rate, that the metal flowing out through tube 740 has a constant composition of 1.10% Mn, 2.00% Ti and 0.30% V, resulting in a constant flow of super pure alloy A–286 into the ingot mould 704. The liquid pool maintained on top of the continuously cast ingot is heated by means of argon operated plasma beam source 716 of same design as source 706.

It is, of course, to be understood, that the present invention is, by no means, limited to the particular arrangements shown in the drawings, but also comprises any modifications within the scope of the appended claims.

It is also to be understood, that the particular arrangements as described in the three special examples with regard to FIGS. 1, 2, 3 are only illustrative examples and by no means limit the scope of the invention to those particular arrangements described. Especially each individual beam source, crucible, pressure range, mould arrangement, operating gas etc. may be replaced by any other type of such items as are lying within the scope of the appended claims.

What we claim is:

1. In a method of refining metals, especially steel and alloys, which includes the steps of: at an absolute pressure of not exceeding 100 millitorrs electron heating the melt to be refined, subsequently stopping said electron heating and subjecting the thus treated melt to plasma heating while adding at least one easily volatilizable alloying constituent to the melt, and while maintaining said plasma heating of said melt teeming the melt into a mold at a rate resulting in a freezing rate within the range of from 0.1 to 10 centimeters per minute.

2. A method of refining metals, especially steel and alloys in at least two crucibles separable from each other, which includes the steps of: alternately heating the melt in said crucibles in a vacuum by electron heating to eliminate volatile impurities from the respective melt by evaporation, stopping the electron heating in the respective crucible and subjecting the melt therein to plasma heating, teeming the contents of one crucible into a mold while starting to subject the contents in another crucible to electron heating, and continuing said cycle so that one crucible is ready for teeming when another crucible has completed teeming.

3. A method according to claim 2, which includes the steps of: effecting the teeming of the refined metal into a mold in a continuous manner and cutting the obtained ingots into ingots of desired length.

4. A method according to claim 2, which includes: teeming the contents of each crucible in one and the same mold and interrupting the teeming operation when the cast ingot has reached the desired length.

5. A method of refining metals, especially steel and alloys, which includes the steps of: in a vacuum electron heating in first vessel means a melt to be refined for eliminating volatilizable impurities by evaporation, subsequently stopping said electron heating in said first vessel means and subjecting the melt therein to plasma heating, transferring the treated melt from said first vessel means to second vessel means while charging said first vessel means with a new charge to be refined, subjecting the melt in said second vessel means to plasma heating, and teeming the treated melt from said second vessel means into a mold while preparing the charge in said first vessel means for transfer to said second vessel means.

6. A method of refining metals, especially steel and alloys, which includes the steps of: preparing the melt to be refined in first vessel means by means of electron heating at an absolute pressure of not exceeding 100 millitorrs pressure, continuously transferring the flow from said first vessel means to second vessel means while continuously adding material to be refined to said first vessel means, de-gassing the melt in said second vessel means at an absolute pressure of not exceeding 100 millitorrs pressure while heating the melt in said second vessel means by electron heating, transferring the melt from said second vessel means to third vessel means and subjecting the melt in said third vessel means to plasma heating while alloying the melt in said third vessel means with at least one easily volatilizable constituent selected from the group consisting of Mn, Al, Cu, and Pb, at a pressure approximately near normal atmospheric pressure, and subsequently teeming the thus treated melt from said third vessel means in a mold.

7. A method according to claim 6, in which the treated melt is teemed continuously into a continuous casting mold at atmospheric pressure, and in which the teemed material after solidification is cut into sections of desired length.

8. A method of refining metals, especially steel and alloys, which includes the steps of: in a vacuum purely electron heating the melt to be refined for eliminating volatilizable impurities by evaporation and subsequently stopping the said electron heating and subjecting the thus treated melt to a heating at least partially by ion beams.

9. A method of refining metals, especially steel and alloys, which includes the steps of: in a vacuum purely electron heating melt to be refined for eliminating volatilizable impurities by evaporation and subsequently stopping the said electron heating and subjecting the thus treated melt to a heating at least partially by plasma electron beam heating at pressures within the range of from above 100 millitorrs and near atmospheric pressure.

10. An apparatus for refining metals, especially steel and alloys, which includes: closed vacuum-tight furnace means, crucible means arranged within said furnace means and adapted to receive material to be refined, first material supply means adapted to be connected to said crucible means for furnishing thereto the basic material to be refined, second material supply means adapted selectively to be connected to said crucible means for conveying alloying constituents thereto, gas exhaust conduit means associated with said furnace means for selectively creating therein an absolute pressure of not exceeding 100 millitorrs, electron heating means connected to said furnace means for selective electron heating the contents in said crucible means, and plasma heating means likewise associated with said furnace means and operable selectively to be made effective and ineffective for selective plasma heating of the contents of said crucible means.

11. An arrangement according to claim 10, which includes: a mold within said furnace means and also includes means operable selectively to separate the space containing said mold from the space containing said crucible means to thereby permit operating said mold under atmospheric pressure while a refining operation is proceeding in said crucible means.

12. An apparatus according to claim 11, which includes: plasma heating means associated with said mold.

13. An apparatus according to claim 10, which includes: a plurality of molds associated with said furnace means for receiving the plasma heated melt.

14. An arrangement according to claim 13, which includes: distributing means arranged between the molds and the crucible means and adjacent thereto and operable selectively to convey the melt from said last-mentioned crucible means to any one of said molds.

15. An arrangement according to claim 14, in which said distributing means is variable in its position relative to said molds.

16. An arrangement according to claim 15, which includes: plasma heating means associated with said distributing means.

17. An arrangement according to claim 11, in which the mold has a retractable bottom.

18. An arrangement according to claim 10, in which said crucible means include at least one water-cooled crucible.

19. An apparatus for refining metals, especially steel and alloys, which includes: a first closed vacuum-tight furnace chamber; a second closed vacuum-tight furnace chamber; each of said furnace chambers having crucible means arranged therein and having associated therewith first material supply means adapted to be connected to said crucible means for supplying thereto the basic material to be refined and also having associated therewith second material supply means adapted selectively to supply alloying constituents to the respective crucible means adjacent thereto, each of said crucible means furthermore having associated therewith electron heating means and plasma heating means for respectively selectively electron heating and plasma heating the contents of the respective crucible means adjacent thereto; means respectively associated with said crucible means for emptying each of said crucible means independently of each other, and mold means adapted selectively to be separated from said first and second furnace chambers and to be connected thereto so that the contents of either crucible means may selectively be emptied into said mold means while the refining operation in the respective other crucible means is proceeding.

20. An apparatus for refining metals, especially steel and alloys, which includes: a first vacuum-tight furnace chamber, a first melting crucible in said first chamber, a second vacuum-tight furnace chamber, a second melting crucible in said second chamber at a level lower than said first chamber, said first chamber having associated therewith first supply means for supplying basic material to said first crucible to be refined therein, each of said first and second chambers also having associated therewith gas exhaust means for creating a vacuum therein and also electron heating means for electron heating the material in the respective crucible pertaining thereto, first overflow chanel means leading from said first crucible to said second chamber, a third furnace chamber, second supply means leading into said third chamber for supplying alloying constituents to said third crucible, plasma heating means associated with said third chamber for plasma heating material received by said third crucible, overflow means leading from said second crucible to said third chamber, a mold, and overflow means leading from said third crucible to said mold.

21. An arrangement according to claim 20, which has interposed between said third chamber and said mold a fourth chamber with a fourth crucible and with an overflow leading from said fourth chamber to said mold, and additional heating means for additionally heating the melt prior to the melt reaching said mold.

22. An apparatus according to claim 20, in which the mold is a continuous casting plant.

23. An apparatus for refining metals, especially steel and alloys, which includes: closed vacuum-tight furnace means, crucible means arranged within said furnace means and adapted to receive material to be refined, first material supply means adapted to be connected to said crucible means for furnishing thereto the basic material to be refined, second material supply means adapted selectively to be connected to said crucible means for conveying alloying constituents thereto, gas exhaust conduit means associated with said furnace means for selectively creating therein an absolute pressure of not exceeding 100 millitorrs, electron heating means connected to said furnace means for selective electron heating the contents in said crucible means, ion ray heating means likewise associated with said furnace means and operable selectively to be made effective and ineffective for selective ion ray heating of the contents of said crucible means.

24. An apparatus for refining metals, especially steel and alloys, which includes: closed vacuum-tight furnace means, crucible means arranged within said furnace means and adapted to receive material to be refined, first material supply means adapted to be connected to said crucible means for furnishing thereto the basic material to be refined, second material supply means adapted selectively to be connected to said crucible means for conveying alloying constituents thereto, gas exhaust conduit means associated with said furnace means for selectively creating therein an absolute pressure of not exceeding 100 millitorrs, electron heating means connected to said furnace means for selective electron heating the contents in said crucible means, and plasma-electronic heating means permitting operation at pressures within the range of from 100 millitorrs to approximately atmospheric pressure.

References Cited
UNITED STATES PATENTS 3,183,077  5/1965  Kraus _______________ 75—49
3,257,197  6/1966  Death et al. _________ 75—10 X

OTHER REFERENCES

Journal of Metals, December 1962, pp. 906–911.

DAVID L. RECK, *Primary Examiner.*

H. W. TARRING, *Assistant Examiner.*

Notice of Adverse Decision in Interference

In Interference No. 96,657, involving Patent No. 3,342,250, H. Treppschuh and R. L. Hentrich, METHOD OF AND APPARATUS FOR VACUUM MELTING AND TEEMING STEEL AND STEEL-LIKE ALLOYS, final judgment adverse to the patentees was rendered Oct. 16, 1975, as to claims 8, 10, 11, 12, 17, 18, 20, 22 and 23.

[*Official Gazette January 13, 1976.*]

Disclaimer 3,342,250.—*Helmut Treppschuh* and *Robert L. Hentrich*, Geisweid, Germany. METHOD OF AND APPARATUS FOR VACUUM MELTING AND TEEMING STEEL AND STEEL-LIKE ALLOYS. Patent dated Sept. 19, 1967. Disclaimer filed Mar. 31, 1976, by the assignee, *Stahlwerke Südwestfalen Aktiengesellschaft*.

Hereby enters this disclaimer to claim 8 of said patent.

[*Official Gazette June 1, 1976.*]